(12) United States Patent
Luick

(10) Patent No.: US 6,941,421 B2
(45) Date of Patent: Sep. 6, 2005

(54) ZERO DELAY DATA CACHE EFFECTIVE ADDRESS GENERATION

(75) Inventor: David Arnold Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 319 days.

(21) Appl. No.: 10/282,519

(22) Filed: Oct. 29, 2002

(65) Prior Publication Data

US 2004/0083350 A1 Apr. 29, 2004

(51) Int. Cl.$^7$ .............................................. G06F 12/00
(52) U.S. Cl. ....................... 711/128; 711/129; 711/122; 711/219
(58) Field of Search .......................... 711/3, 122, 129, 711/220, 214, 219, 118; 712/211, 213; 365/230.06

(56) References Cited

U.S. PATENT DOCUMENTS

| | | | | |
|---|---|---|---|---|
| 4,578,750 A | * | 3/1986 | Amdahl et al. | 712/221 |
| 4,739,470 A | * | 4/1988 | Wada et al. | 712/217 |
| 5,023,776 A | * | 6/1991 | Gregor | 711/122 |
| 5,097,436 A | * | 3/1992 | Zurawski | 708/711 |
| 5,212,778 A | * | 5/1993 | Dally et al. | 711/218 |
| 5,297,266 A | * | 3/1994 | Tanaka | 711/214 |
| 5,532,947 A | | 7/1996 | Potter et al. | |
| 5,713,001 A | * | 1/1998 | Eberhard et al. | 711/216 |
| 5,829,049 A | * | 10/1998 | Walker et al. | 711/168 |
| 5,940,877 A | | 8/1999 | Eickemeyer | |
| 6,161,166 A | | 12/2000 | Doing | |
| 6,226,722 B1 | | 5/2001 | Shippy | |
| 6,321,296 B1 | | 11/2001 | Pescatore | |
| 6,415,355 B1 | * | 7/2002 | Hirofuji | 711/114 |

* cited by examiner

*Primary Examiner*—Mano Padmanabhan
*Assistant Examiner*—Mardochee Chery
(74) *Attorney, Agent, or Firm*—Dillon & Yudell LLP

(57) ABSTRACT

A method and system for accessing a specified cache line using previously decoded base address offset bits, stored with a register file, which eliminate the need to perform a full address decode in the cache access path, and to replace the address generation adder multiple level logic with only one level of rotator/multiplexer logic. The decoded base register offset bits enable the direct selection of the specified cache line, thus negating the need for the addition and the decoding of the base register offset bits at each access to the cache memory. Other cache lines are accessed by rotating the decoded base address offset bits, resulting in a selection of another cache word line.

16 Claims, 6 Drawing Sheets

ZERO DELAY DATA CACHE EFFECTIVE ADDRESS GENERATION

BACKGROUND OF THE INVENTION

1. Technical Field

The present invention relates in general to the field of computers, and, in particular, to cache memory in a computer system. Still more particularly, the present invention relates to an improved method and system for accessing a cache line using a stored decoded address.

2. Description of the Related Art

The use of data caches for performance improvements in computing systems is well known and extensively used. A cache is a high speed buffer that holds recently used data (including instructions) from system memory.

Data in the cache is identified and located using the system memory address for the data. The system memory address contains most significant bits (MSBs) and least significant bits (LSBs) in the respective left and right portions of the address. The MSBs can logically be viewed as a pointer to a starting position in system memory, and the LSBs, when concatenated with the MSBs, provide an offset to complete the address. In cache memory addressing, the MSBs are called "tags" and the LSBs are called "indexes."

Each index identifies a line (block) of cache memory. The tag is used to confirm that the line contains data from a particular address in system memory. That is, the tag and index are concatenated for comparison to the system memory address to confirm that the cache line contains data assigned the system memory address.

Level 1 (L1) cache has relatively few cache lines, typically from 64 to a few hundred. Each cache line contains many words (the largest number of bits of data that the computer can handle internally, typically 64 bits). Typically, each cache line contains 32 words (128 bytes).

To access a particular cache line, address generation logic transmits a set of enabled signals that result in the contents of the particular cache line being transmitted to a set of output pins. The signal to the cache line is the result of a decoding of the cache line's index to generate the signal. That is, the pre-decoded form of the index is input into a decoder that has an output of multiple (typically 64) pins. Each unique index results in one and only one of the decoder's output pins having an enable signal.

FIG. 1 depicts a typical configuration of prior art logic for selecting a cache line. An instruction 100 contains an operand code (OPCD) 102 and a displacement 104. Register file 106 contains multiple registers, including Register A (RA) and Register B (RB). RA contains the base address and RB contains the offset to the base address for the data requested. That is, RA contains a pointer to the block of system memory containing the requested data, and RB contains an offset, defined by instruction 100, that completes the memory address containing the requested data. Alternatively, RA contains the base address and displacement 104 directly describes the offset to the base address for the data requested.

Adder/ALU 108 combines the base address from RA and the offset (from RB or displacement 104) and sends the sum result (address) to a Target Register (RT). Extracted from the RT is the index 110 and offset 112 for the word (chosen by offset 112) in the correct cache line in L1 Cache 116. Decoder 114 decodes the six lines of cache address index 110 and outputs a signal on one of the pins in the output 64-way line selector 120. Offset 112 is decoded within L1 cache 116 to select the desired word from the line selected by 64-way line selector 120.

The system illustrated in FIG. 1 is burdened with the delay of adding two operands together and then decoding the cache address index 110 every time a cache line is accessed using the logic shown in grouping 122. Therefore, there is a need for a system that avoids such a delay.

SUMMARY OF THE INVENTION

Thus, the present invention is a method and system for accessing a specified cache line using previously decoded base address offset bits, stored with a register file, which eliminate the need to perform a full address decode in the cache access path, and to replace the address generation adder multiple level logic with only one level of rotator/multiplexer logic. The decoded base register offset bits enable the direct selection of the specified cache line, thus negating the need for the addition and the decoding of the base register offset bits at each access to the cache memory. Other cache lines are accessed by rotating the decoded base address offset bits, resulting in a selection of another cache line.

By storing decoded base address offset bits, rather than encoded (binary) base address offset bits, the present invention is able to reduce delay required in the prior art caused by logic that decodes each cache access. Thus, the multi-level logic shown in prior art FIG. 1 in grouping 122, which includes an adder, target register and line select decoder, is replaced by a single level logic of multiplexer/rotators such as shown in grouping 322 in FIG. 3. This single level logic results in a net zero delay for cache accesses.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
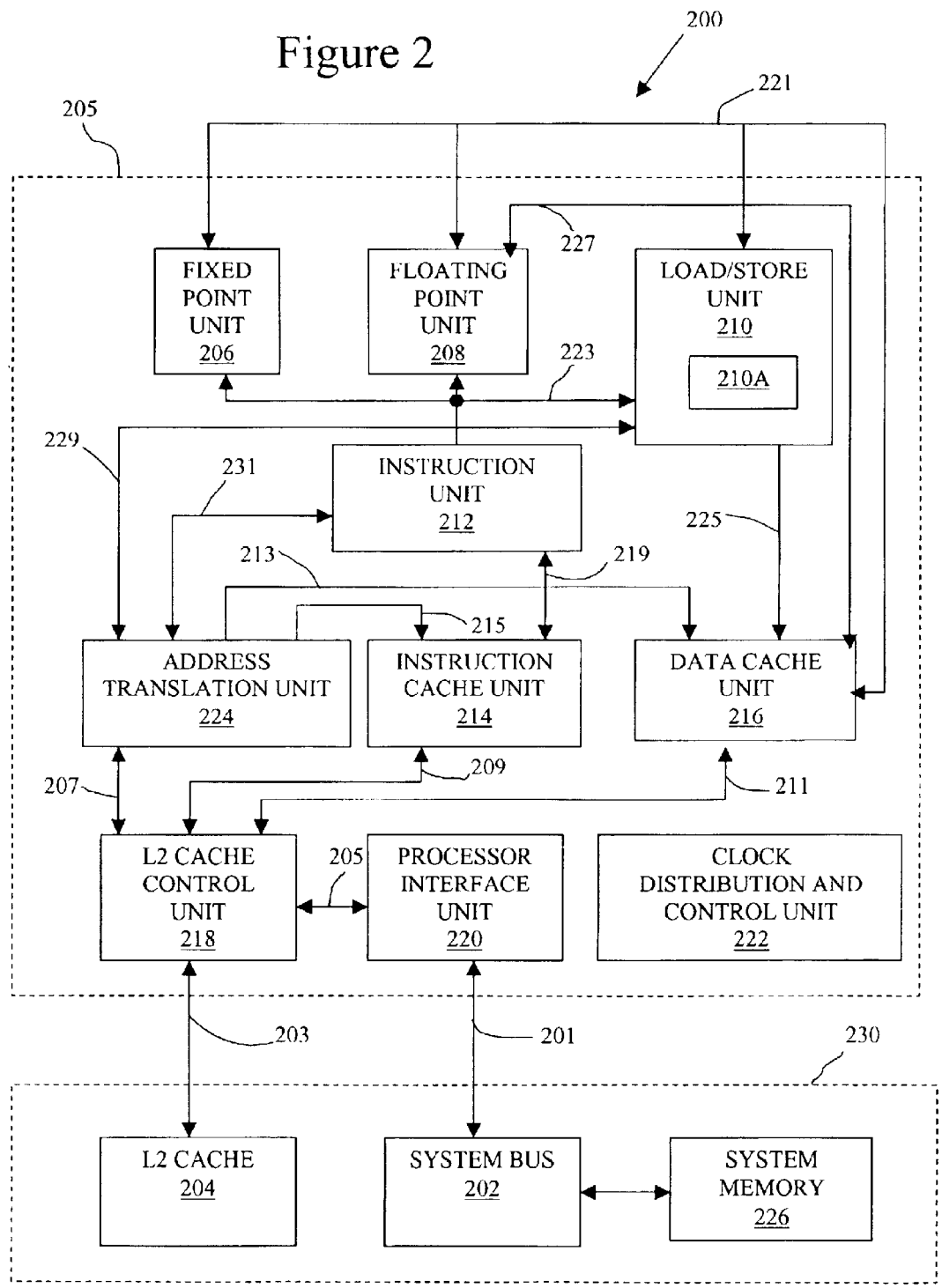
FIG. 2 illustrates a data processing system used by the present invention.

With reference now to FIG. 2, there is depicted an exemplary data processing system 200 having a processor 205 and memory system 230 that provides a suitable environment for the practice of the present invention. As shown, processor 205 is coupled to memory system 230 that includes an interface system bus 202, a L2 cache 204 and a main or system memory 226. Processor 205 includes the following functional units: a fixed point unit (FXU) 206, a floating point unit (FPU) 208, a load store unit (LSU) 210, an instruction unit (IU) 212, an instruction cache unit (ICU) 214, a data cache unit (DCU) 216, a L2 cache control unit 218, a processor interface unit (PIU) 220, a clock distribution and control 222 and address translation unit (ATU) 224. As it is well known to those skilled in the art, in a multiprocessor environment, several processors and their associated L2 caches interface to system bus 202 allowing shared access to main memory, also known as L3 memory, 226.

The various functional units of processor 205 interface with each other over data, address, and/or control I/O pins, lines and/or busses that will be described in greater detail hereinafter. It should be noted that a "line" can refer to either a single signal line or a collection of signal lines, i.e., a bus. Generally, the functional units of processor 205 communicate as follows. Clock distribution and control 222 provides clocking signals to all functional units on processor chip 205. System bus 202 interfaces to PIU 220 over a bi-directional bus 201 and over a bus 205 with CCU 218. L2 cache 204 communicates with CCU 218 over a bus 203 and CCU 218 communicates instructions with ICU 214 over a bus 209 and with DCU 216 over a bus 211. CCU 218 provides address information to ATU 224 and receives miss interface signals over a bus 207. LSU 210 and IU 212 are utilized to provide request interfaces to ATU 224 and receive translation state information over lines 229 and 231. ATU 224, in turn, provides translated address information to ICU 214 over a line 215 and to DCU 216 over a line 213. ICU 214 interfaces to instruction unit 212 over bus 219 and DCU 216 provides data to FXU 206, FPU 208 and LSU 210 over bus 221 while IU 212 provides instructions to FXU 206, FPU 208 and LSU 210 over bus 223. LSU 210 provides data to DCU 216 over bus 225 and FPU 208 provides and receives data to DCU 216 over a bus 227 to LSU 210.

A dispatcher within load store unit 210 directs instructions from instruction unit 212 to DECODE stage buffers of the various execution units and to a load store unit pipeline buffer, which is preferably integral to load store unit 210. The function of load store unit 210 is to generate effective addresses, e.g., on a 64 bit wide bus, for load and store instructions and to serve as a source and sink for general purpose registers data. The general purpose registers (not shown) are registers, within data processing system 200, that are available for any use by a processor's design or operating system. During writes to the cache, registers hold the data and addresses and the effective address is computed by an address generation routine (AGEN) utilizing address translation logic 210a, which in a preferred embodiment comprises rotators 308 and 310 described below with reference to FIG. 3. During cache reads, data from the cache is latched in a register and sent to the general purpose registers or to fixed point unit 206. The output of the pipeline buffer is provided to the load store unit's decode and address generator, i.e., AGEN, that contains the general purpose registers and address generation adders and the data output of the decoder is provided to a data register and a data selector. The address output of the AGEN is then provided to an EXECUTE stage buffer.

Figure 3:
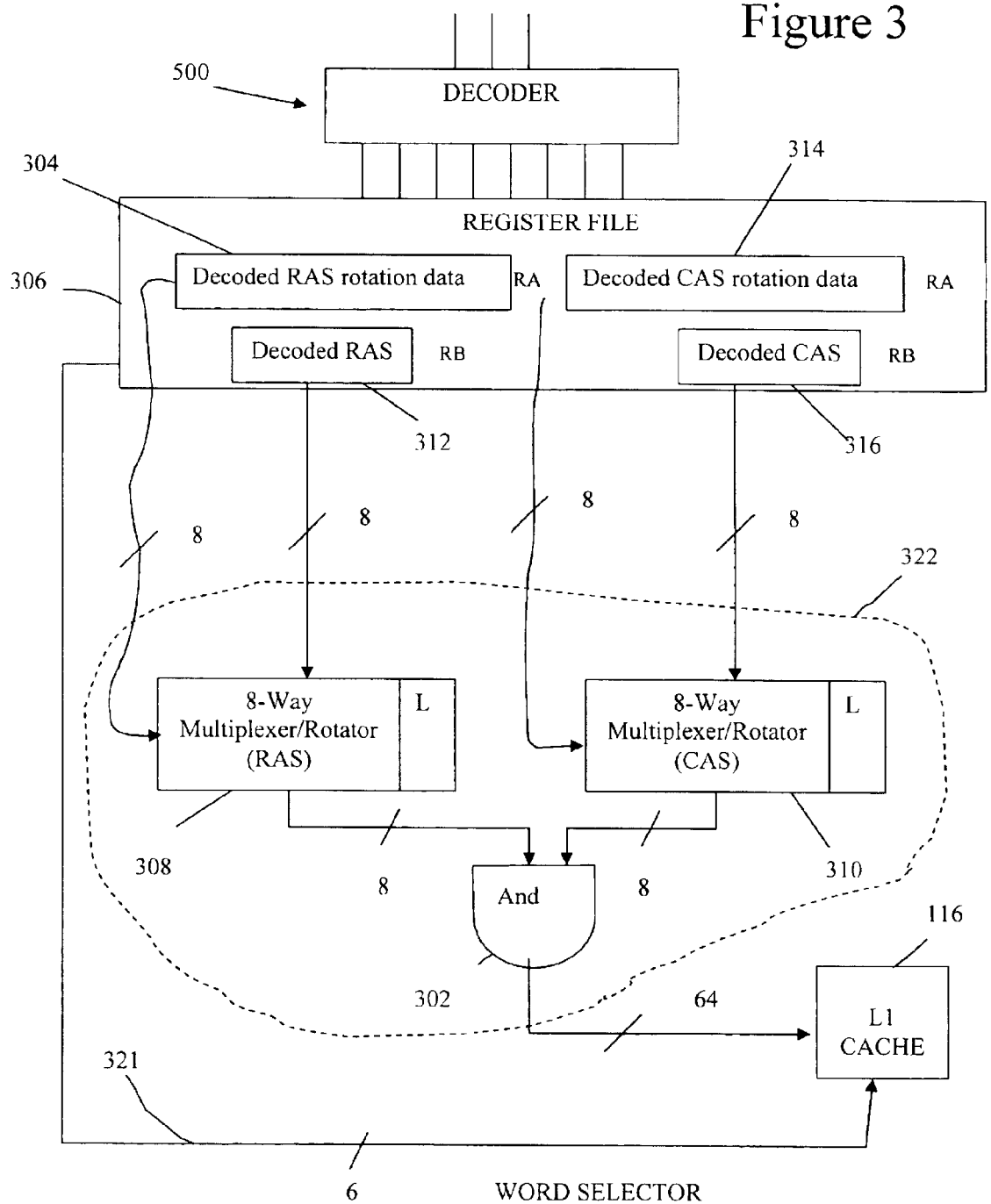
FIG. 3 depicts logic used by the present invention to select a cache line using stored decoded information.

With reference now to FIG. 3, there is depicted a cache line selector according to a preferred embodiment of the present invention for selecting a specific cache line. Register file 306 includes decoded Column Address Select (CAS) rotation data 314, decoded Row Address Select (RAS) data 312, decoded RAS rotation data 304 and decoded CAS data 316.

Decoded CAS data 316 and RAS data 312 together describe an index for locating a specific cache line by identifying cache lines as columns and rows. For example, consider a cache system having 64 lines. Rather than have 64 wires running throughout all of logic for pulling a particular cache line, the 64 lines are described as being in 8 rows having 8 columns, resulting in 64 descriptors. Thus, each cache line is identified by its CAS identifier and its RAS identifier.

Note that the contents of the RAS/CAS files shown in register file 306 are from the output of a decoder 500, which decodes results of previous adder/ALU operations generating RAS/CAS lines, from existing cache registers, or from other operational units, such as floating point calculations, etc. without increasing those units' operational delay. Details of the operation of decoder 500 are discussed in relation to FIG. 5 below.

Figure 1:
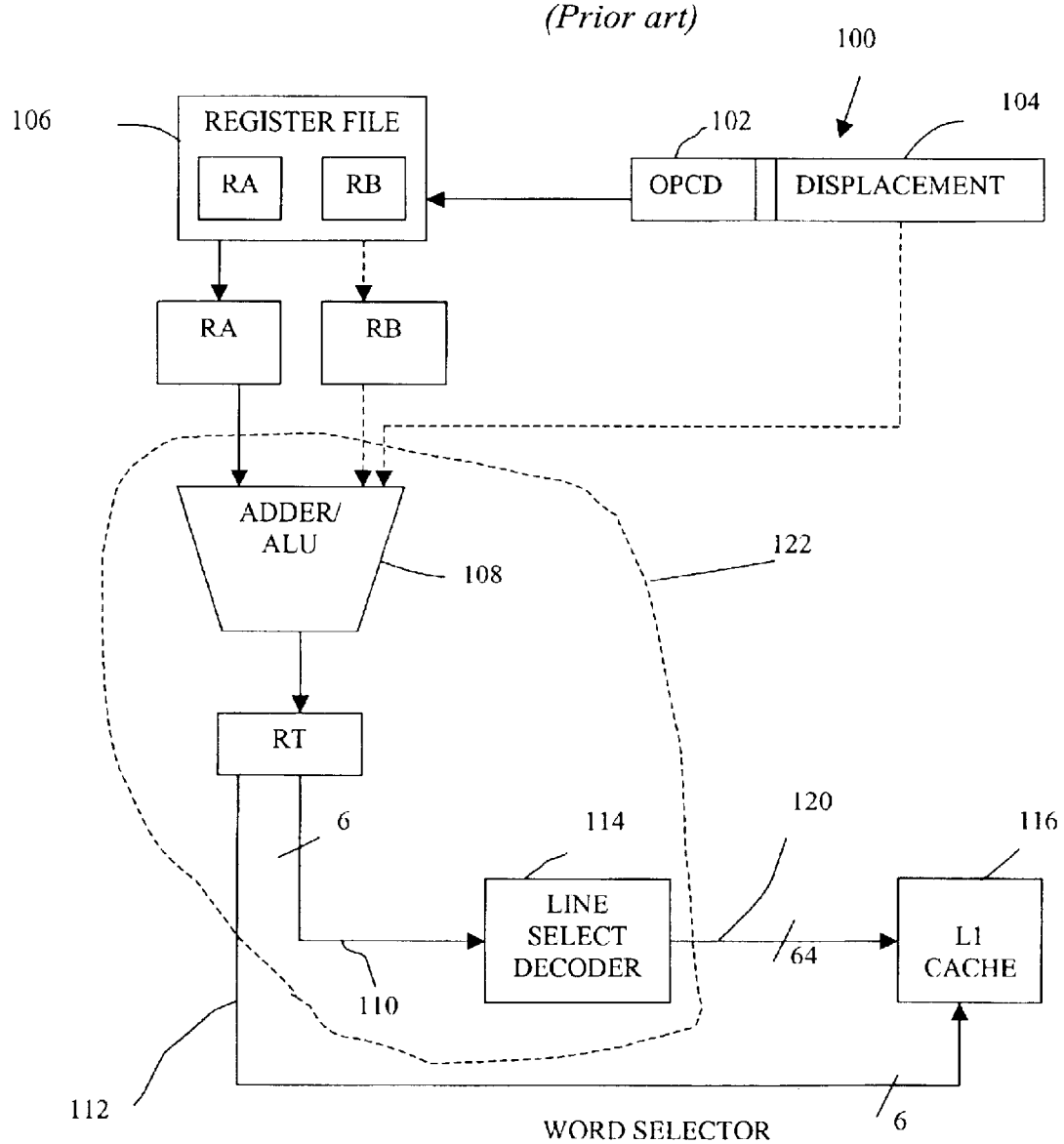
FIG. 1 depicts a system to select a cache line as taught by the prior art.

As the RAS/CAS data in register file 306 is decoded to pre-describe a specific cache line, the logic in grouping 122 in FIG. 1 for determining the specific cache line is no longer needed, and is replaced by the single level of logic in a grouping 322, whose elements are discussed in detail below.

Figure 4:
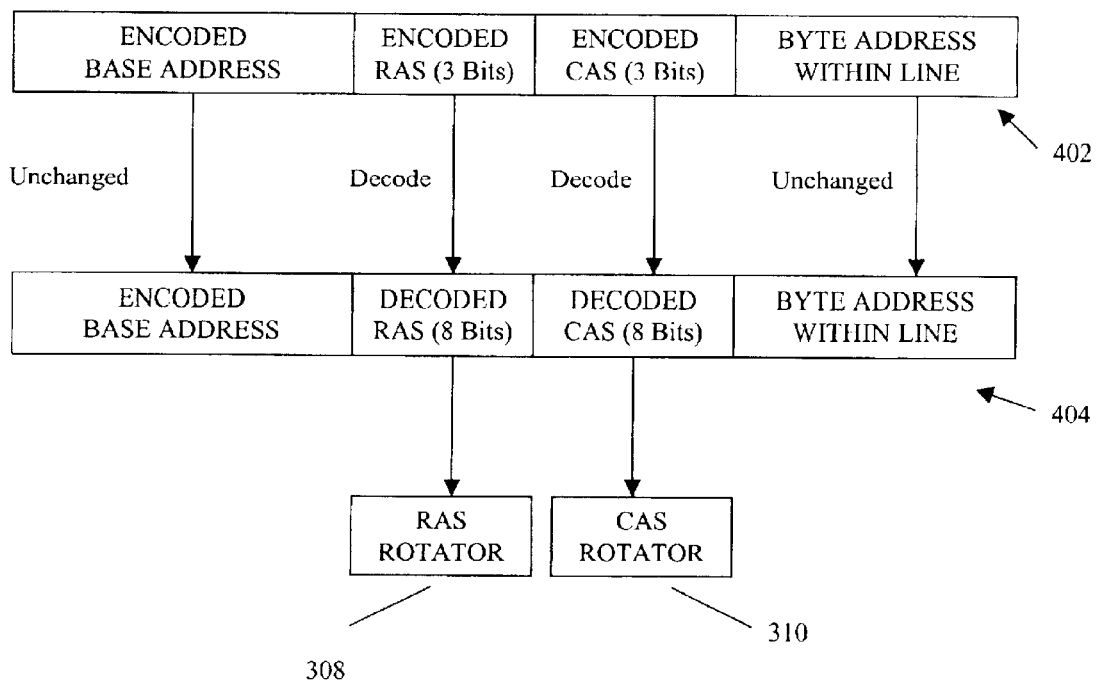
FIG. 4 illustrates an exemplary content of a register storing decoded displacement bits in accordance with the present invention.

Reference is now made to FIG. 4 to address the significance of data shown in register file 306. In FIG. 4, block 402 depicts a normal register file address representation, such as utilized by the system shown in FIG. 1. The address line includes an encoded base address, which is stored in Register A (RA) in FIG. 1. Encoded RAS and encoded CAS, as well as the byte address within the line (word selector offset 112 in FIG. 1) are stored in Register B (RB) in FIG. 1. In FIG. 1, encoded RAS and encoded CAS are shown combined as index 110. That is, assuming encoded RAS contains 3 bits and encoded CAS has 3 bits, appending the RAS and CAS encoded bits results in 6 encoded bits.

Returning to FIG. 4, block 404 depicts a modified register file address image according to the preferred embodiment of the present invention. While the base address and byte address with the line remain encoded, the RAS and CAS bits are stored in decoded form, allowing them to be passed directly to RAS rotator 308 and CAS rotator 310 shown in FIG. 3, which operate as unary adders. The decoded RAS bits shown in block 404 include both the decoded RAS rotation data 304 and decoded RAS data 312 shown in FIG. 3, and the decoded CAS bits shown in block 404 include both the decoded CAS rotation data 314 and decoded CAS data 316 shown in FIG. 3.

Returning again to FIG. 3, decoded RAS rotation data 304 and decoded CAS rotation data 314 control the 8-Way latch multiplexer/rotators 308 and 310 respectively to set the RAS and CAS signals to the proper cache line. The RAS and CAS lines are logically combined in AND logic 302, resulting in a 64-line cache line select output to L1 cache 116. Only one of the 64-lines is logically unique (high or low) to select the desired cache line. Word selector 321 operates in a manner similar to that described for offset 112 in FIG. 1.

Figure 5:
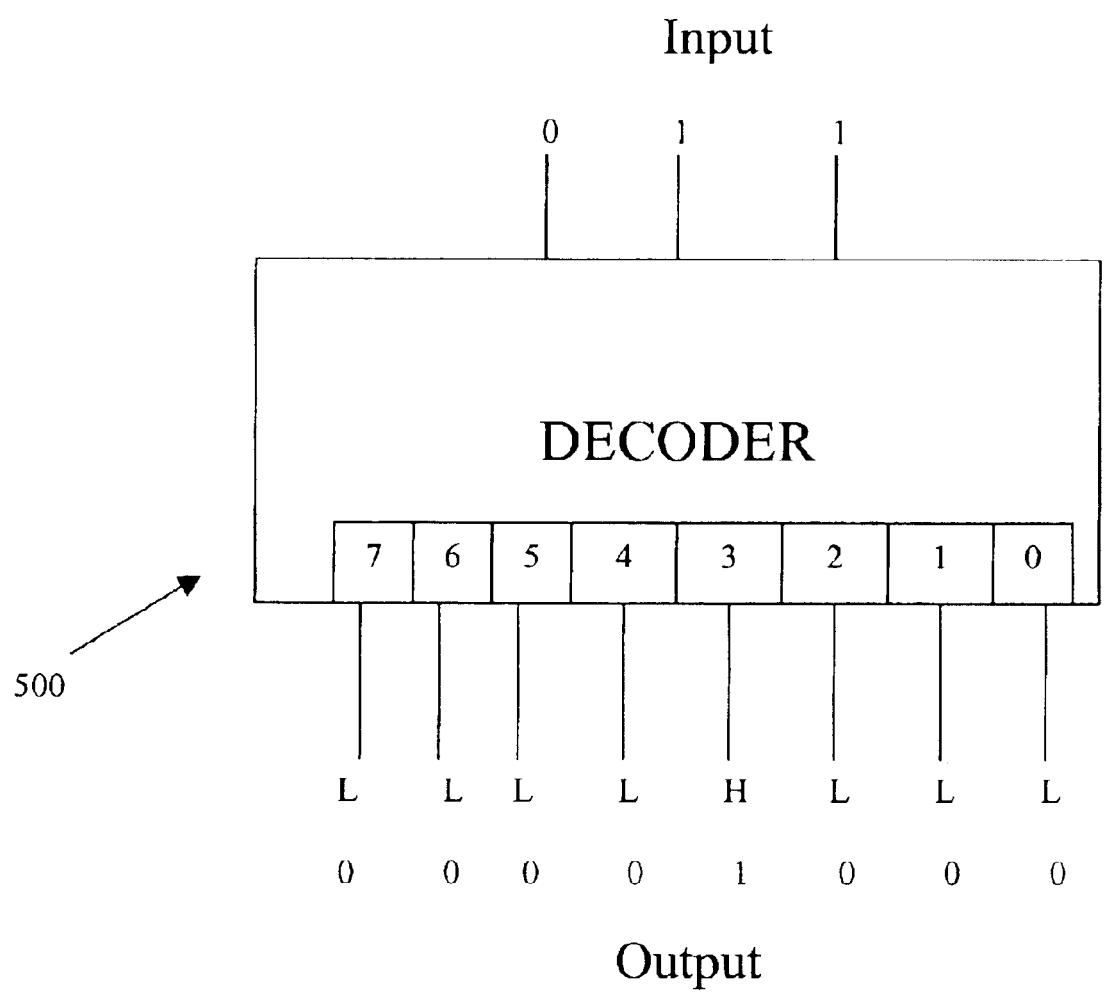
FIG. 5 depicts a decoder used by the present invention.

The decoded RAS and CAS data (304, 306, 314, 316) is from an output of a decoder 500 such as shown in FIG. 5. For example, assume an encoded binary number "011" describing RAS data is input into decoder 500. Output from decoder 500 are 8 lines (0–7). When "011" is input, a signal on line "3" changes to a logically unique value (preferably high), while the output on all other lines (7, 6, 5, 4, 2, 1, 0) remain low.

Figure 6:
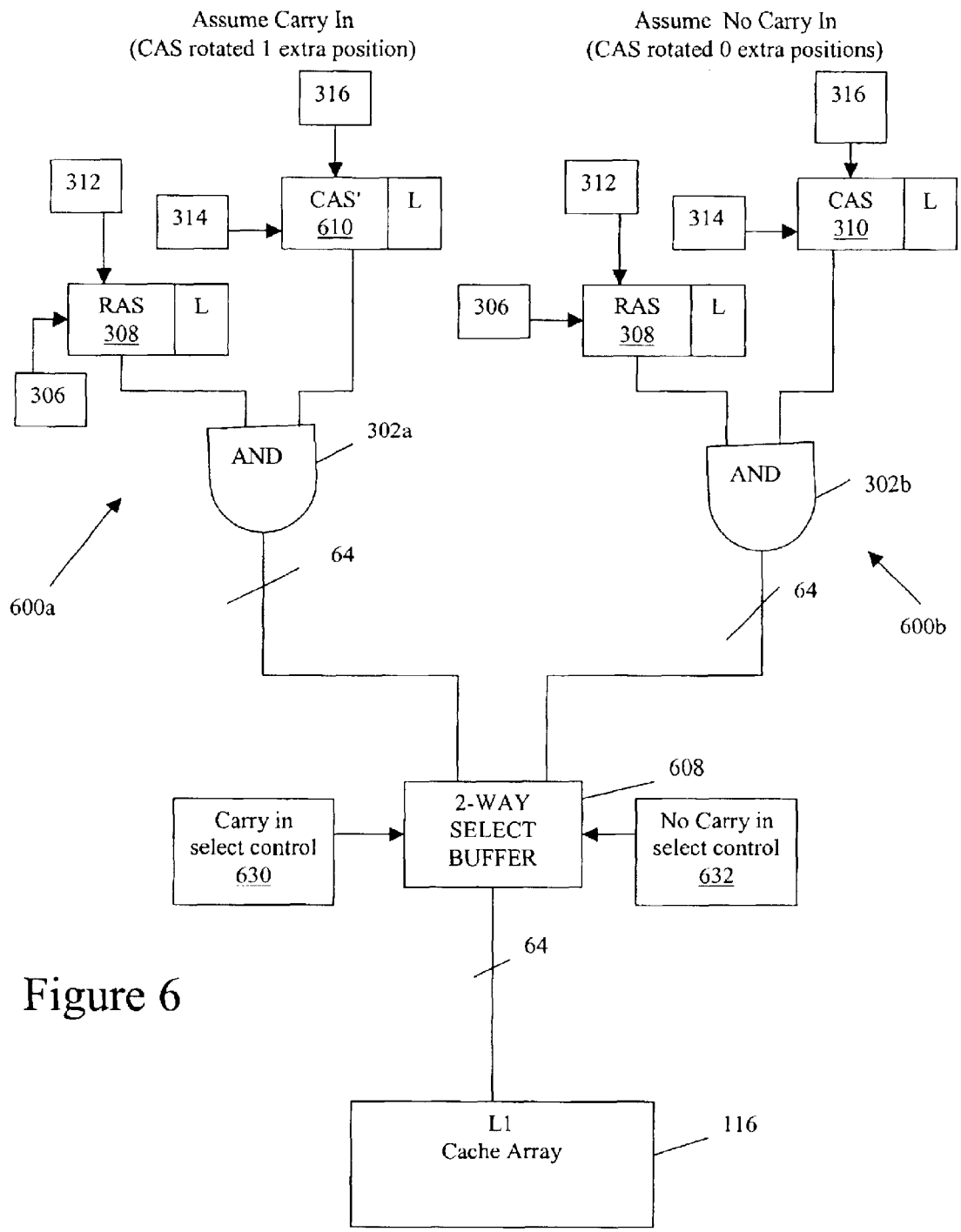
FIG. 6 illustrates logic used to handle carry-ins when decoding cache addresses.

It is recognized that there may be occasions in which there is a carry-in for the rotators. However, such occasions are typically occur less than 10% of the time. Thus, in the preferred embodiment, a carry-in adder for the RAS and CAS is not used. Alternatively, however, such a carry-in adder may be incorporated to generate a carry in for input into rotators 308 and 310. In a preferred embodiment, however, carry-ins are handled using logic depicted in FIG. 6. As shown in FIG. 6, 64-line cache line selects are generated as described above with reference to FIG. 3. However, CAS' multiplexer/rotator 610 is CAS multiplexer/rotator 310 that has rotated decoded CAS 316 one extra position. This single extra rotation accommodates the carry-in, resulting in a proper cache line signal. The determination of whether there is a carry-in or not is preferably made concurrently with the determination of the 64-line cache line selection. Thus, logic 600*a* is used when assuming that there is a carry-in, and logic 600*b* is used when assuming no carry-in. When a determination is made whether there is a carry-in or not, then a 2-way select buffer 608 selects either the output of AND logic 302*a* from 600*a* or AND logic 302*b* from 600*b*, with the selection controlled by either a "carry-in" select control 630 or a "no carry-in" select control 632, and outputs the selected AND logic output to L1 cache array 116.

Note in FIG. 6 that 2-way select buffer 608 is preferably placed physically approximately midway between AND logic and L1 cache array 116, and AND logic 302 is physically oriented approximately midway between the rotators and the 2-way select buffer 608. The distance between the rotators and the L1 cache array 116 are such that drivers are needed anyway to drive the wiring capacitances inherent in the wiring distances involved, thus the logic AND 302 and 2-way select buffer 608 add no delay time in accessing the cache array 116.

The present invention thus takes advantage of the nature of low order effective address generations used to index L1 caches. This nature includes the historical data to support the position that almost all displacements added to a base register to form the effective address are very short for most commercial workloads, and only a very few effective address bits, typically 5 or 6, are required to begin a data cache access. Further, such displacements are usually constant, and the base register value is highly repetitive, especially the low order for bits (usually zeros) such that carryouts from a low order 8–12 bit effective address addition are very highly predictable. Thus decoded cache line access bits (from effective addresses) are stored and manipulated as described, thus reducing the delay in accessing a cache line.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A cache line selector comprising:
 a register file containing decoded displacement data for identifying a cache line, said decoded displacement data being from a modified register file address image obtained during a first cache access operation, and wherein said decoded displacement data includes a base register offset and a rotation data, and wherein said decoded displacement data includes a decoded Row Address Select (RAS) component and a Column Address Select (CAS) component;
 a plurality of output lines from said register file;
 a cache memory coupled to said register file via said plurality of output lines, wherein said displacement data selectively causes an access of said cache line by transmitting said decoded displacement data to said cache memory via said plurality of output lines;
 a first rotator coupled to said register file, wherein said first rotator rotates said base register offset according to said rotation data to select a cache line in said cache memory;
 a second rotator, wherein said second rotator rotates said CAS component;
 a third rotator for speculatively rotating said CAS component one extra position if said CAS component has a carry-in when logically AND combined with said RAS component; and
 a 2-way select buffer for selecting said first and second rotators' output or said first and third rotator's output according to whether a carry-in has occurred.

2. The cache line selector of claim 1, wherein said first rotator rotates said RAS component of said decoded displacement.

3. The cache line selector of claim 1, further comprising:
 an AND gate used for said step of logically AND combining said CAS component and said RAS component, wherein said AND gate is physically positioned midway between said rotators and said 2-way select buffer, and wherein said 2-way select buffer is physically positioned midway between said AND gate and said cache memory.

4. The cache line selector of claim 1, further comprising logic for combining said RAS and CAS component to result in a selection of a cache line according to said decoded displacement.

5. A system comprising:
 a processor;
 a cache memory;
 an interconnect connecting the processor to the cache memory; and
 a cache line selector composed of:
  a register file containing decoded displacement data for identifying a cache line, said decoded displacement data being from a modified register file address image obtained during a first cache access operation, and wherein said decoded displacement data includes a base register offset and a rotation data, and wherein said decoded displacement data includes a decoded Row Address Select (RAS) component and a Column Address Select (CAS) component;

a plurality of output lines from said register file;

a cache memory coupled to said register file via said plurality of output lines, wherein said displacement data selectively causes an access of said cache line by transmitting said decoded displacement data to said cache memory via said plurality of output lines;

a first rotator coupled to said register file, wherein said first rotator rotates said base register offset according to said rotation data to select a cache line in said cache memory;

a second rotator, wherein said second rotator rotates said CAS component;

a third rotator for speculatively rotating said CAS component one extra position if said CAS component has a carry-in when logically AND combined with said RAS component; and a 2-way select buffer for selecting said first and second rotators' output or said first and third rotator's output according to whether a carry-in has occurred.

6. The system of claim 5, wherein said first rotator rotates said RAS component of said decoded displacement.

7. The system of claim 5, further comprising:

logic for combining said RAS and CAS component to result in a selection of a cache line according to said decoded displacement.

8. The system of claim 5, further comprising:

an AND gate used for said step of logically AND combining said CAS component and said RAS component, wherein said AND gate is physically positioned midway between said rotators and said 2-way select buffer, and wherein said 2-way select buffer is physically positioned midway between said AND gate and said cache memory.

9. A system comprising:

a processor;

a cache memory;

an interconnect connecting the processor to the cache memory; and a cache line selector composed of:

a register file containing decoded displacement data for identifying a cache line, said decoded displacement data being from a modified register file address image obtained during a first cache access operation, and wherein said decoded displacement data includes a base register offset and a rotation data, and wherein said decoded placement data includes a decoded Row Address Select (RAS) component and a Column Address Select (CAS) component;

a plurality of output lines from said register file;

a cache memory coupled to said register file via said plurality of output lines, wherein said displacement data selectively causes an access of said cache line by transmitting said decoded displacement data to said cache memory via said plurality of output lines;

a first rotator coupled to said register file, wherein said first rotator rotates said base register offset according to said rotation data to select a cache line in said cache memory;

a second rotator, wherein said second rotator rotates said CAS component;

a third rotator for speculatively rotating said RAS component one extra position if said RAS component has a carry-in when logically AND combined with said CAS component; and a 2-way select buffer for selecting said first and second rotators' output or said first and third rotator's output according to whether a carry-in has occurred.

10. The system of claim 9, wherein said first rotator rotates said RAS component of said decoded displacement.

11. The system of claim 9, further comprising:

logic for combining said RAS and CAS component to result in a selection of a cache line according to said decoded displacement.

12. The system of claim 9, further comprising:

an AND gate used for said step of logically AND combining said CAS component and said RAS component, wherein said AND gate is physically positioned midway between said rotators and said 2-way select buffer, and wherein said 2-way select buffer is physically positioned midway between said AND gate and said cache memory.

13. A tangible computer usable storage medium comprising:

computer program code for storing, in a register file, decoded displacement data for identifying a cache line, said decoded displacement data being from a modified register file address image obtained during a first cache access operation, and wherein said decoded displacement data includes a base register offset and a rotation data, and wherein said decoded displacement data includes a decoded Row Address Select (RAS) component and a Column Address Select (CAS) component;

computer program code for capturing an output from a plurality of output lines from said resister file, wherein a cache memory in coupled to said register file via said plurality of output lines, and wherein said displacement data selectively causes an access of said cache line by transmitting said decoded displacement data to said cache memory via said plurality of output lines, and wherein a first rotator is coupled to said register file, and wherein said computer program code causes a first rotator to rotate said base register offset according to said rotation data to select a cache line in said cache memory;

computer program code for causing a second rotator to rotate said CAS component;

computer program code for causing a third rotator to speculatively rotate said RAS component one extra position if said RAS component has a carry-in when logically AND combined with said CAS component; and computer program code for causing a 2-way select buffer to select said first and second rotators' output or said first and third rotator's output according to whether a carry-in has occurred.

14. The tangible computer usable storage medium of claim 13, wherein said first rotator rotates said RAS component of said decoded displacement.

15. The tangible computer usable storage medium of claim 13, further comprising:

computer program code for combining said RAS and CAS component to result in a selection of a cache line according to said decoded displacement.

16. The tangible computer usable storage medium of claim 13, further comprising:

computer program code for causing an AND gate to logically AND combine said CAS component and said RAS component.

* * * * *